United States Patent [19]

Horiguchi et al.

[11] Patent Number: 4,843,431
[45] Date of Patent: Jun. 27, 1989

[54] EXPOSURE CONTROL AND COLOR CORRECTING DEVICE

[75] Inventors: Masashi Horiguchi; Minoru Yakubo, both of Tokyo, Japan

[73] Assignee: Fuji Photo Film Co., Ltd., Kanagawa, Japan

[21] Appl. No.: 180,917

[22] Filed: Apr. 13, 1988

[30] Foreign Application Priority Data

Apr. 13, 1987 [JP] Japan .................................. 62-90502

[51] Int. Cl.$^4$ ............................................. G03B 27/72
[52] U.S. Cl. ....................................... 355/34; 355/38; 355/35; 350/315; 350/318
[58] Field of Search ........................ 355/32, 33, 35, 71, 355/34, 36, 38; 350/315, 316, 318

[56] References Cited

U.S. PATENT DOCUMENTS

| 3,299,773 | 1/1967 | Jasny | 355/35 |
| 3,775,006 | 11/1973 | Hartman et al. | 355/32 X |
| 3,984,853 | 10/1976 | Bott et al. | 354/246 |
| 4,066,346 | 1/1978 | Toyama et al. | 352/72 |

FOREIGN PATENT DOCUMENTS

| 1283669 | 11/1968 | Fed. Rep. of Germany . | |
| 89944 | 4/1987 | Japan | 355/35 |
| 1274835 | 5/1972 | United Kingdom . | |

Primary Examiner—L. T. Hix
Assistant Examiner—D. Rutledge
Attorney, Agent, or Firm—Sughrue, Mion, Zinn, Macpeak & Seas

[57] ABSTRACT

An exposure device for a color copying apparatus having a filter holding frame mounting a filter plate provided with color filter layers and a transparent section and a pair of aperture plates for forming a variable aperture. The filter holding frame is movable in a first direction perpendicular to an exposure light path to selectively place the filter layer and transparent section into the exposure light path. The aperture plates are movable toward and away from each other in a direction perpendicular to the first direction and to the exposure light path so as to vary the size of aperture formed therebetween. Between the filter holding frame and the pair of aperture plates there is a mechanism comprising pins and cam grooves for relative movement of the filter holding frame and the aperture plates. The cam groove comprises a straight cam section which extends along the moving direction and which is provided to place the pair of aperture blades out of the optical path so as to maintain the maximum size of the variable aperture and an inclined cam section which is provided to bring the pair of the aperture blades into the optical path so as to vary the size of the variable aperture.

7 Claims, 7 Drawing Sheets

EXPOSURE CONTROL AND COLOR CORRECTING DEVICE

BACKGROUND OF THE INVENTION

1. Field of the Invention

The present invention relates to an exposure control device used in a silver salt photographic type color copying apparatus or a color printer for regulating the amount and components of exposure light.

2. Background of the Prior Art

One such exposure control device which is disclosed in, for example, Japanese Patent Publication No. 44-2542 includes two color filter plates and a variable aperture plate both disposed between front and rear lens groups of a lens system. These color filter plates and variable aperture plate are moved in a direction perpendicular to the optical axis of the lens system so as to regulate the amount and color components of light passed therethrough in order to control the color balance and density of a copy. Each color filter plate includes two color filter sections and a transparent section between the two color filter sections. These two color filter sections have two different colors of the three primary colors, namely blue, green and red, or of cyan, magenta and yellow. One of these three colors is used in both color filters.

Color originals from which copies are made are generally classified into two types, namely color printed materials and color photographic materials. Because of different coloring materials used in these color printed and photographic materials, these two types of materials have different spectral distributions for the three primary colors. As a result, copies of these materials tend to have different color densities and/or color balances. In order to make copies having the same color density and color balance from any one of the two color materials, filters are used according to spectral sensitivities of the photosensitive materials used. In addition, it is required to adjust the color temperature of a light source to match the photosensitive material to be used.

The conventional color copying apparatus with color filter plates to be moved in and out of an optical path requires a filter adjusting mechanism which is complicated in construction and, therefore, make the apparatus large.

OBJECT OF THE INVENTION

It is, therefore, an object of the present invention to provide an exposure device with color filter plates and a variable aperture plate which are driven in cooperation with each other so as to be made compact.

SUMMARY OF THE INVENTION

The above and other objects of the present invention are accomplished by providing an exposure device which includes a filter holding frame. Within the frame are a filter plate provided with color filter layers and a transparent section. The frame is movable in a first direction perpendicular to the optical path. The exposure device further includes a pair of aperture plates which are movable in cooperation with the filter holding frame toward and away from each other in a second direction perpendicular to the first direction and to the optical path. For this cooperation of the aperture plates, there is formed in the filter holding frame a pair of cam grooves each comprising a straight cam section and an inclined cam section. These cam grooves are engaged by pins fixed to the aperture plates. When the pins are within the inclined cam section of the cam grooves of the filter holding frame, the aperture plates are moved vertically toward and away from each other as a result of the horizontal movement of the filter holding frame so as to vary the size of aperture. On the other hand, the aperture plates are maintained fully opened.

DETAILED DESCRIPTION OF THE INVENTION

Figure 1:
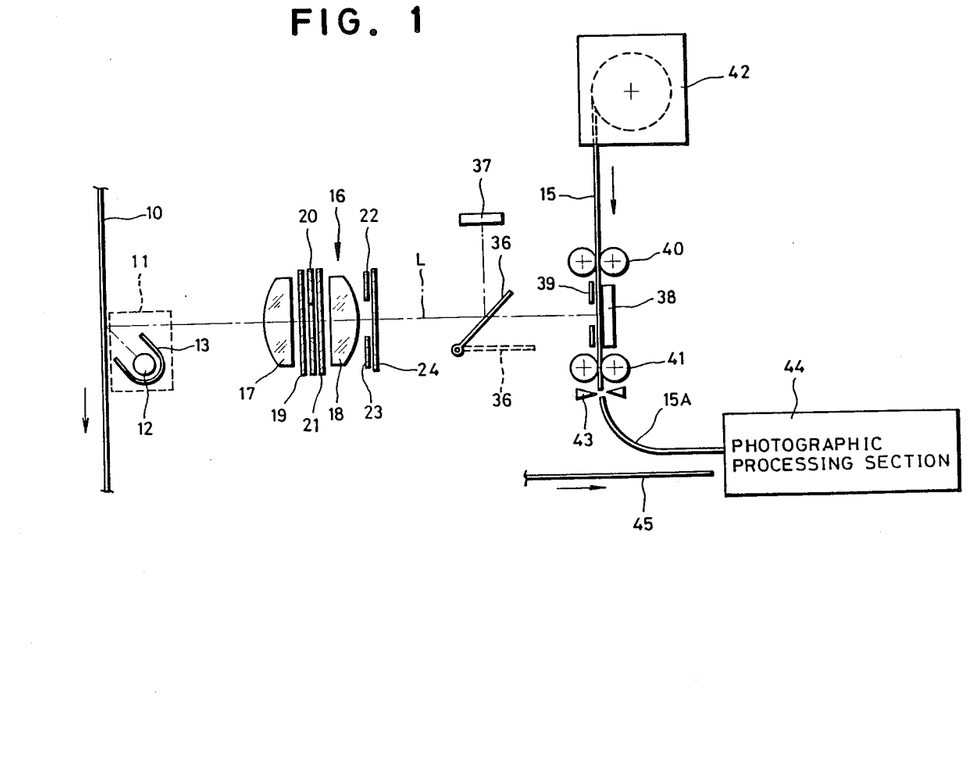
FIG. 1 is a fragmentary side view showing a silver salt type copying apparatus embodying the present invention.

Referring now to FIG. 1 there is shown therein a silver salt photographic type color copying apparatus embodying the present invention. As shown, a color original 10 from which a color copy is to be made is moved at a constant speed in a direction shown by an arrow. While the color original is moved, the color original 10 is illuminated with a slit-like illumination beam emitted from an illumination light source 11 which comprises a lamp 12 and a reflector 13. Between the color original 10 and a color photosensitive material 15, there is a lens unit 16 which both forms an image of the color original 10 on the color photosensitive material 15 and also regulates three color components and the amount of exposure light passed therethrough so as to make a color copy with corrected color and density. Specifically, the lens unit 16 has front and rear lens groups 17 and 18; a first filter plate 19, a fixed aperture plate 20 and a second filter plate 21 disposed in this order between the front and rear lens groups 17 and 19; and a pair of aperture plates 22 and 23 and a third filter plate 24 disposed in this order behind the rear lens group 18. The pair of aperture plates 22 and 23 are movable toward and away from each other so as to constitute a linearly variable diaphragm.

Figure 2:
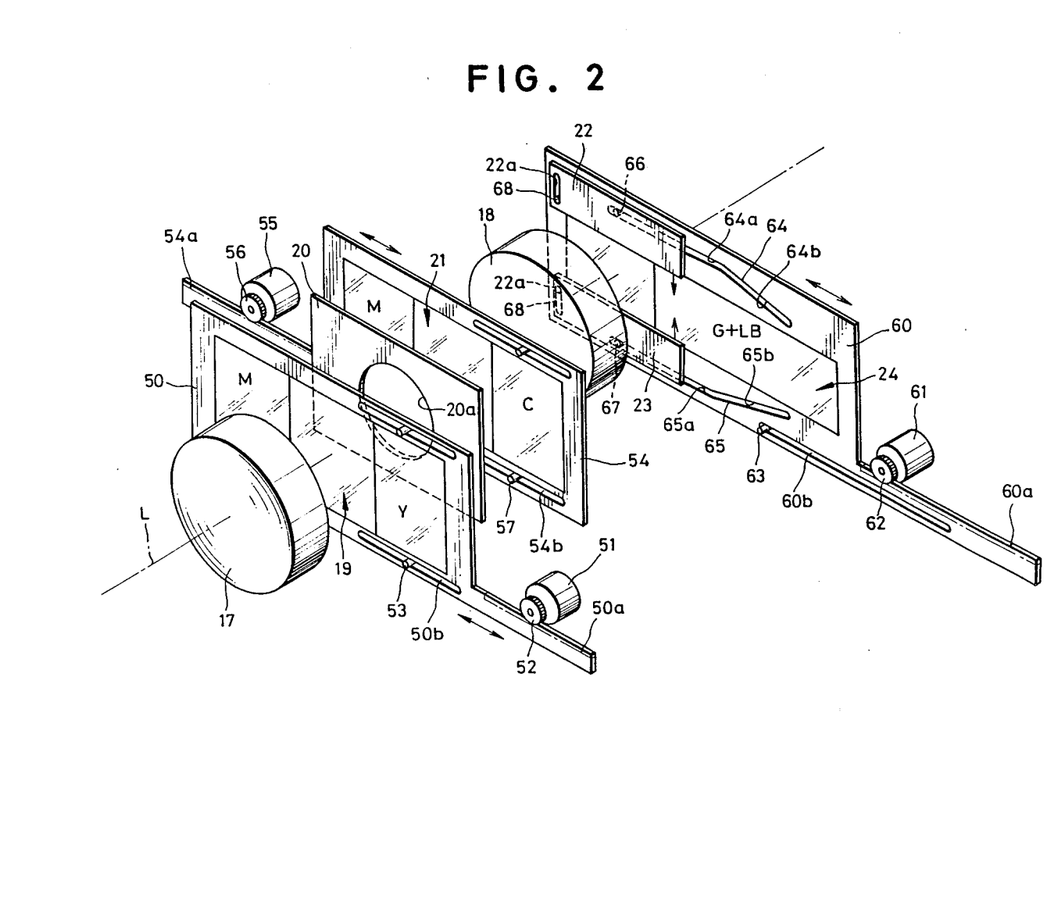
FIG. 2 is a perspective view of the exposure control device of a preferred embodiment of the present invention.
Figure 3:
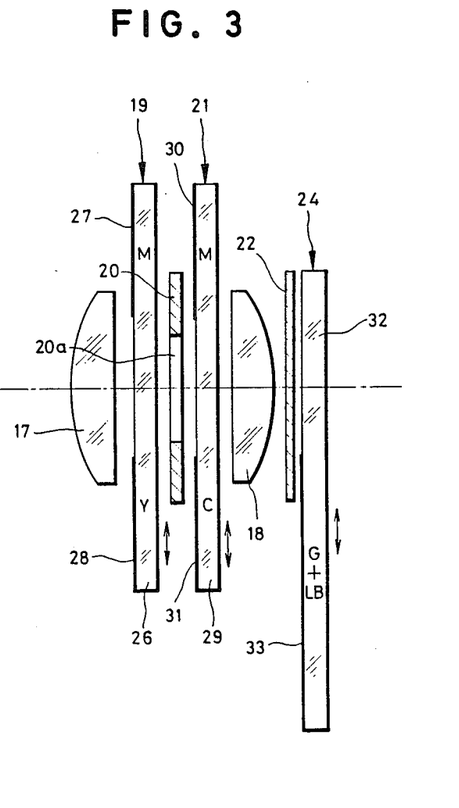
FIG. 3 is an enlarged cross sectional view of the exposure device of FIG. 2.
Figure 4:
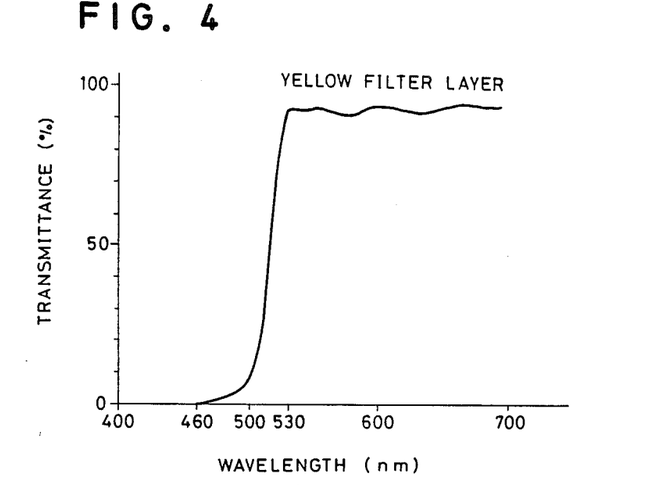
FIG. 4 to 6 are graphs showing spectral transmittance for yellow, magenta and cyan filter layers, respectively.
Figure 5:
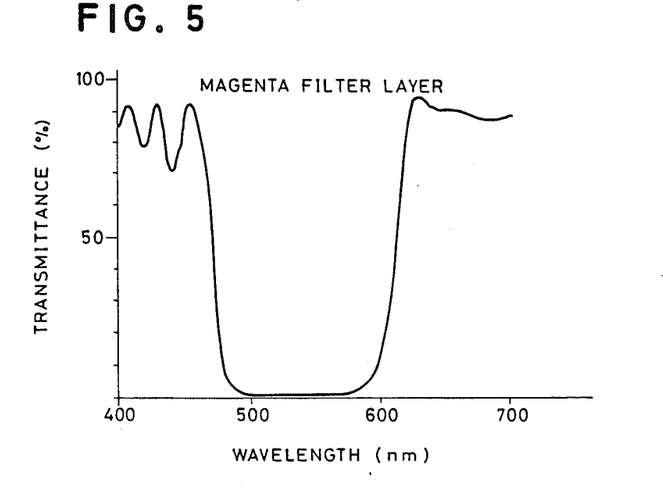
Figure 6:
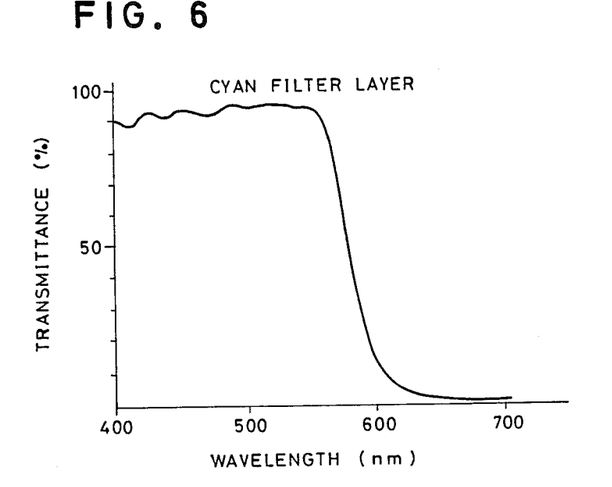

The first filter plate 19, as is shown in detail in FIGS. 2 and 3, comprises a transparent glass plate 26 with color filter layers, namely a magenta filter layer 27 and a yellow filter layer 28, coated on its front surface. Between the filter layers 27 and 28 there is left a transparent or non-filter area on the glass plate 26. The second filter plate 21 also comprises a transparent glass plate 29 with color filter layers, namely a magenta filter layer 30 and a cyan filter layer 31, coated on its front surface. Between the filter layers 30 and 31 there is also left a transparent area on the glass plate 29. These filter layers, namely, yellow 28, magenta 27 and 30, and cyan 29, have spectral transmittances shown in FIGS. 4 through 6, respectively. Since these first and second filter plates 19 and 21 are located close to a pupil of the lens system, the exposure light in the form of a slit line is prevented from being color mixed, even partially. As is shown clearly in FIGS. 2 and 3, the fixed aperture plate 20 has an aperture opening 20a defined by a central circle.

Figure 7:
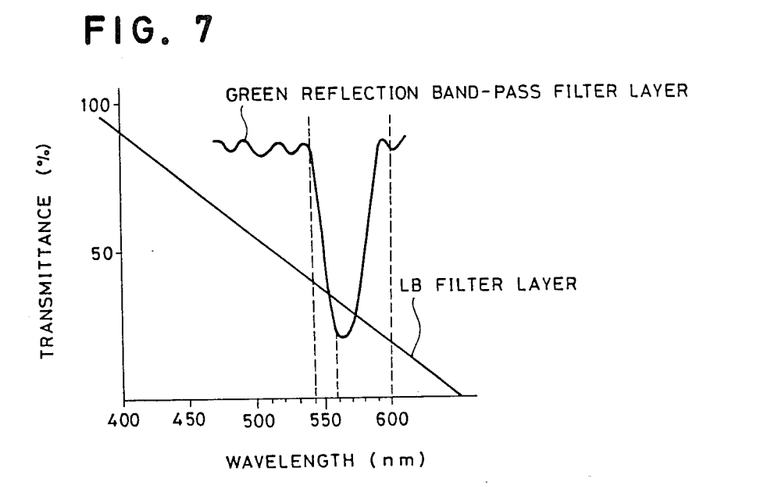
FIG. 7 is a graph showing spectral transmittances for a green reflection type band-pass filter layer and a light balancing filter layer.

As is known in the art, inks used in ordinary printed matters have a green component having a peak wavelength approximately at 570nm and, on the other hand, dyes used in photographic prints have a green component having a peak wavelength approximately at 535 nm. For accomplishing the same color balance and density with color copies from color originals of printed matter and photographic prints, a band-pass filter is often used to substantially shift the peak of sensitivity of a color photosensitive material. For example, if the color photosensitive material 15 has a sensitivity distribution for green having a peak approximately at 560 nm, a green reflection band-pass filter, having a spectral transmittance shown in FIG. 7, is used to cut off green light having wavelengths on a relatively longer wavelength side of a green wavelength range so as to shift the peak of sensitivity distribution of the color photosensitive material to approximately 540 nm. Generally, a light balancing filter (LB filter), having a spectral transmittance also shown in FIG. 7, is used as a color conversion filter in color copying apparatus. For this reason, the third filter plate 24 comprises a transparent glass plate 32 with a combination filter layer (G + LB) 33 which includes both a green reflection band-pass filter layer (G filter layer) and a light balancing layer (LB filter layer) coated on one of its surfaces. These filter layers have spectral transmittances shown in FIG. 7.

For the green reflection band-pass filter layer, an interference filter is used to reflect green light having relatively long wavelengths. When using such an interference filter, reflected green light is partially reflected by the rear lens group 18 toward the interference filter and partially passes therethrough. If the reflected light is repeatedly bounced between the rear lens group 18 and the interference filter, it creates ghost images, In order to avoid such ghost images, a variable diaphragm comprising the aperture plates 22 and 23 is arranged in front of the green reflection band-pass filter to prevent undesirable light from reaching the green reflection band-pass filter.

Behind the lens unit 16, there is a swingable mirror shutter 36 which is placed in the optical path L, as is shown by a solid line in FIG. 1, when the color original 10 is to be measured by light measurement means 37 to detect its density. The swingable mirror shutter 36 is removed out of the optical path L when a copy is made.

In an exposure station, a pressure plate 38 holds the color photosensitive material 15 flat against a slit mask 39. On upper and lower sides of the exposure station there are arranged pairs of conveyor rollers 40 and 41. A photosensitive material magazine 42 contains therein the color photosensitive material 15 in the form of a roll which is withdrawn by means of the conveyor rollers 40 and 41. After exposure, the color photosensitive material 15 is cut off by means of a cutter 43 to form a color sheet 15A which is sent into a processing section 44 incorporated in the copying apparatus. The color sheet 15A is superimposed over a color image-receiving material 45 in the form of sheet in the processing section 44 for diffusion transfer processing.

Referring now to FIG. 2 showing a filter driving mechanism, the first filter plate 19, which is movable, is mounted in a filter frame 50, in a direction perpendicular to the optical path L. This filter frame 50 is formed with a rack 50a and a straight slot 50b which slides along a fixed pin 53 fitted therein. The rack 50a is in mesh with a gear 52 coupled to a stepping motor 51. The second filter plate 21 is mounted in a filter holder 54, which is formed with a rack 54a in mesh with a gear 56 coupled to another stepping motor 55a. The second filter plate 21 is also formed similarly with a straight slot 54b which slides along a fixed pin 57 fitted therein. The third filter plate 24 is mounted in a filter frame 60 which is formed with a rack 60a and a straight slot 60b slidably engaged by a fixed pin 63. The rack 60a is in mesh with a gear 62 coupled to a stepping motor 61. These filter frames 50, 54 and 60 are independently moved in reversible directions perpendicular to the optical path L by means of the respective stepping motors 51, 55 and 61 through respective pin-and-slot engagements.

The filter frame 60 for the third filter plate 24 is formed with upper and lower cam slots 64 and 65 in which are fitted and slide pins 66 and 67 of the aperture plates 22 and 23, respectively. Each cam slot 64 or 65 has a horizontally extending cam section 64a or 65a for maintaining the aperture plates 22 and 23 away from each other and an inclined cam section 64b or 65b for moving the aperture plates 22 and 23 close to each other. The aperture plates 22 and 23 further have vertical slots 22a for guiding the aperture plates 22 and 23 to move up and down through fixed pins 68.

Figure 8A:
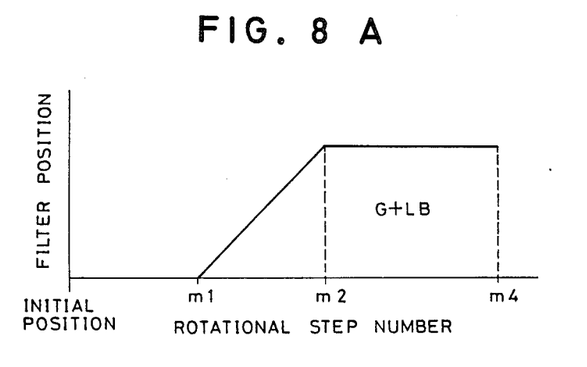
FIG. 8(A) is a diagram illustrating the filter positions of the green reflection type band-type filter layer and the light balancing filter layer.
Figure 8B:
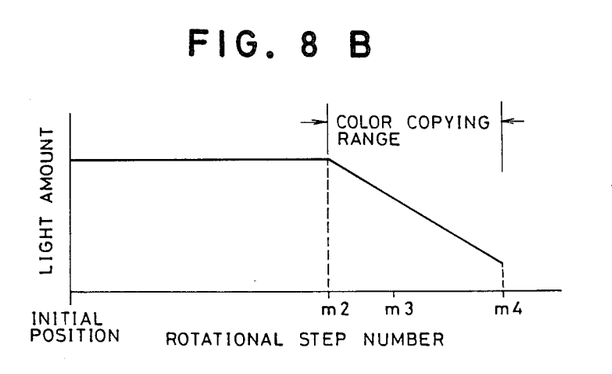
FIG. 8(B) is a diagram illustrating the size of the variable aperture.

Referring jointly to FIGS. 8A and 8B, there is shown therein the relationship between the position of the third filter plate 24 (FIG. 8A) and the aperture plates 22 and 23 (FIG. 8B). The stepping motor 61 moves the third filter plate 29 and thus the aperture plates 22 and 23 according to rotational steps in a range between 0 (initial position) and extending up to $m_4$. When a density measurement is effected, the stepping motor 61 stays at its initial position 0 and, on the other hand, when color copying is being carried out, the stepping motor 61 produces rotational steps between $m_2$ and $m_4$.

While the stepping motor 61 rotates through the rotational steps between the initial position 0 and $m_1$, the third filter plate 24 is placed with its transparent section in the optical path L and the pins 66 and 67 of the aperture plates 22 and 23 stay in the straight cam sections 64a and 65a of the cam slots 64 and 65. Therefore, the aperture plates 22 and 23 maintain the maximum size of aperture. When the stepping motor 61 rotates more than the number of rotational steps $m_1$, the third filter plate 24 begins to place the combination filter layer (G+LB) 33 in the optical path L. Between the rotational steps $m_2$ and $m_4$ of the stepping motor 61, the third filter plate 24 moves so that the combination filter layer (G+LB) 33 is fully placed in the optical path L. Simultaneously with this movement of the third filter plate 24 and beginning with the rotational step $m_2$, the inclined cam sections 64b and 65b of the upper and lower cam slots 64 and 65 of the filter frame 60 are slidably guided by the pins 66 and 67 of the aperture plates 22 and 23, forcing the aperture plates 22 and 23 to move toward each other. Consequently, the aperture plates 22 and 23 variably decrease the size of the aperture so as to control the amount of exposure light passed therethrough.

Figure 9:
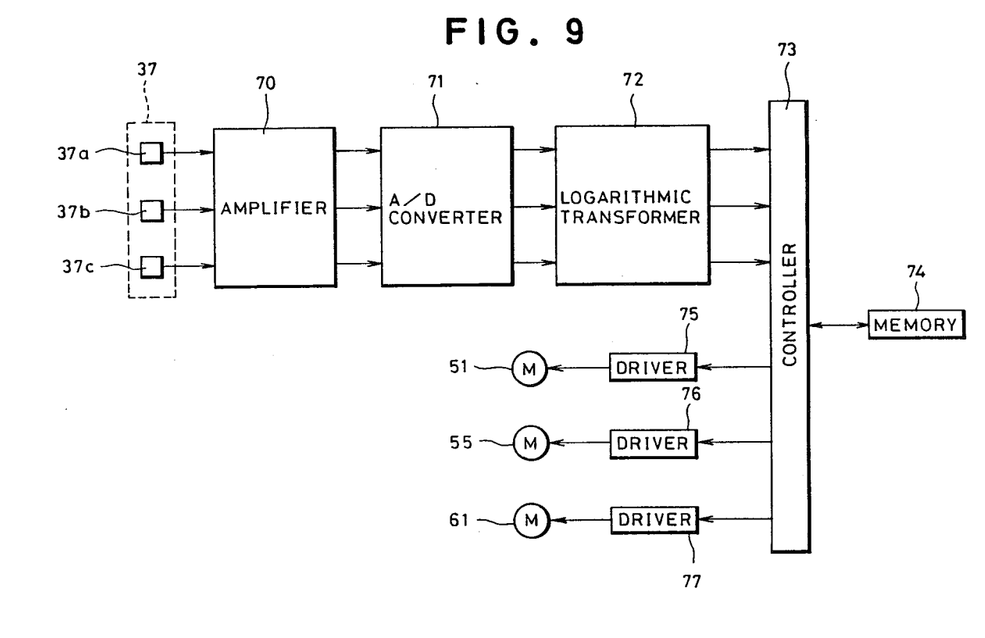
FIG. 9 is a block diagram showing an exposure control circuit used in connection with the exposure control device of FIG. 2.

Shown in FIG. 9 is an exposure control circuit used in connection with the exposure control device according to the present invention. The light measurement means 37 comprises three light sensors 37a, 37b and 37c with selective sensitivities for blue, green and red light for detecting three color components of the light reflected from the color original 10 while the color original is being scanned. Outputs from the respective light sensors 37a to 37c are converted into digital signals by an A/D converter 71 after being amplified by an amplifier 70. These digital signals, after being transformed into logarithmic values by a logarithmic transformer 72, are sent to a controller 73 and then stored in a memory 74.

The controller 73, following the scanning of the color original 12, reads out the data on the three color components of the reflected light measured by the light measurement means 37 to calculate needed amounts of color correction and of density correction by using an exposure calculation formula. According to the calculated amount of color correction, the controller 73 causes drivers 75 and 76 to drive the stepping motors 51 and 52, respectively. Simultaneously, the controller 73 causes a driver 77 to drive the stepping motor 61 according to the calculated amount of density correction so as to move the filter frame 60 in order to place the combination filter layer 33 in the optical path and to move the aperture plates 22 and 23 for variably decreasing the size of the aperture.

In the operation of the exposure control device described above, prior to making a color copy, a color original 10 is scanned to detect its three color densities. For a high accuracy of measurement, the first to third filter plates 19, 21 and 24 are located at their initial positions as shown in FIGS. 2 and 3 to place their transparent sections in the optical path L. The swingable mirror shutter 36 is moved into the optical path in the position shown by a solid line in FIG. 1 to direct the reflected light from the color original 10 to the light measurement means 37. When the third filter plate 24 is at its initial position, the combination filter layer 33 and the aperture plates 22 and 23 are all out of the optical path L, providing the maximum size of aperture.

When the color original 10 is continuously moved down at a constant speed in the direction shown by an arrow shown in FIG. 1 and scanned with a slit line illumination beam emitted from the lamp 12 of the illumination light unit 11, the reflected light from each section of the color original 10 travels to the mirror shutter 36 through the lens unit 16 and is reflected and directed by the mirror shutter 36 to the light measurement means 37. As is described previously, the sensors 37a to 37c of the light measurement means 37 detect three color components of the reflected light. Outputs from the sensors 37a to 37c are stored in the memory 74 after having been subjected to amplification, digital conversion, and logarithmic compression.

After the scanning of the color original 10, the color original is returned to its initial position. The controller 73 reads out form the memory 74 the data of the measured components of the reflected light for the sections of the color original 10 to calculate correction exposures for each color. From the correction exposures for the respective colors, what is common to more than one correction exposure is extracted as the amount of density correction. The remaining correction exposure is used as the amount of color correction. The controller 73 drives the stepping motor 51 and 55 according to the amount of color correction to force the filter frames 50 and 54 to slide in a direction perpendicular to the optical path L, thereby regulating the color components of light passed therethrough. Simultaneously, the controller 73 drives the stepping motor 61 according to the amount of density correction to force the filter frame 60 in a direction perpendicular to the optical path L, thereby regulating the amount of light passed through the aperture plates 22 and 23.

When the stepping motor 51 is driven in the normal direction, the yellow filter layer 28 of the first filter plate 19 is inserted into the optical path L in proportion to the number of rotational steps of the stepping motor 51. On the other hand, when the stepping motor 51 is driven in the reversed direction, the magenta filter layer 27 of the first filter plate 19 is inserted into the optical path L in proportion to the number of rotational steps of the stepping motor 51. In the same way, the stepping motor 55 can selectively insert the cyan and magenta filter layers 31 and 27 into the optical path L in proportional to the number of rotational steps thereof.

By the control of rotation of the stepping motors 51 and 55, it is possible to insert various combinations of two filter layers into the optical path L. Specifically, in one case, two filter layers of the same color but on different filter plates 19 and 21 are placed in the optical path L. In the other case, two differently colored filter layers are placed in the optical path L. These combinations of filter layers are previously stored in the memory 74 and selectively retrieved by the controller 73 so as to control the stepping motors 51 and 55. It will be understood that it is impossible to place simultaneously the three different filter layers, namely magenta, yellow and cyan, in the optical path L in order to regulate the color component of light. However, by varying the size of the aperture formed by the aperture plates 22 and 23, the color component of light can be equivalently regulated.

The stepping motor 61 is controlled by the controller 73 to be driven so as to slide the filter frame 60 in a direction to the left as viewed in FIG. 2 according to the amount of density correction. If it is not needed to introduce any density correction, the stepping motor 61 rotates to the rotational step $m_2$ so that the combination filter layer (G+LB) 33 of the third filter plate 24 is fully placed in the optical path L. On the other hand, in the case that it is needed to introduce some density correction, the stepping motor 61 rotates to a higher rotational step than $m_2$ to vary the size of aperture which is defined by the aperture plates 22 and 23, thereby to regulate the amount of light.

After the adjustment of the filter plates 19, 21 and 24, the color original 10 is again moved at a constant speed in the direction shown by the arrow in FIG. 1. The conveyor rollers 40 and 44 are rotated in synchronism with the movement of the color original 10 to withdraw the photosensitive material 15 from the magazine 42 at a constant speed. When a predetermined time is passed after the commencement of the movement of the color original 10, the mirror shutter 36 is turned to be moved out of the optical path L so as to allow the exposing light reflected from the color original 10 in the form of a slit line to fall on the photosensitive material 15 moving in synchronism with the color original 10, thereby exposing the photosensitive material 15.

When the photosensitive material 15 is being exposed with a slit line exposing beam, the exposing light reflected from the color original 10 is corrected in color balance by the first and second filter plates 19 and 21 and in the amount of light by the aperture plates 22 and 23. Further, the exposing light is adjusted for color temperature by the LB filter layer of the combination filter layer 33 of the third filter plate 24 and a green component of the exposure light having a relatively long wavelengths is cut by the green reflection bandpass filter layer (G) of the combination filter layer 33 of the third filter plate 24. By using the combination of the four filters, the exposure light is regulated so as to make copies with the same image conditions from either printed or photographic originals.

When the whole length of the color original is scanned, the mirror shutter 36 is returned to the position shown by a solid line in FIG. 1 so as to block the optical path L, thereby completing a copy. Following the return of the mirror shutter 36, the exposed part of the photosensitive material 15 is cut off by the cutter 41 to form a photosensitive sheet 15A and then sent into the processing section 44 of the apparatus. There, the exposed photosensitive sheet 15A is superimposed over an image-receiving sheet 45 for diffusion transfer processing in a well-known manner. After a predetermined time needed to form a diffusion image on the image receiving sheet 45, the image-receiving sheet 45 is peeled apart from the photosensitive sheet 15A. Additional details of such a diffusion transfer type color copying apparatus may be obtained by reference to Japanese Patent Unexamined Publication No. 59-204042.

Although the above embodiment of the present invention has been directed to a diffusion transfer type color copying apparatus, it si to be understood that the present invention may be applicable to various kinds of color copying apparatus using silver salt photographic materials such as direct positive photosensitive materials and color printers which make positive images on a photographic paper from negative images.

It is to be noted that, in place of moving a color original, the mirror unit may be moved in synchronism with the lens unit so as to scan a stationary color original.

What is claimed is:

1. An exposure control device, comprising:
    a first filter plate comprising a transparent section and a color filter section;
    a first filter holding frame movable in a first direction perpendicular to an optical axis for holding said first filter plate therein;
    a pair of aperture blades movable toward and away from each other in a direction perpendicular to said first direction for forming a variable aperture therebetween;
    a pair of pins fixed to one of said first filter holding frame and said pair of aperture blades; and
    a pair of cam grooves which are formed in the other of said filter holding frame and said pair of aperture blades and engaged by said pair of pins, each cam groove comprising a straight cam section extending in said first direction for maintaining said pair of aperture blades away from said optical path when said color filter section is out of said optical path and an inclined cam section for moving said pair of said aperture blades into said optical path when said color filter section is moved in said first direction so as to at least partially traverse said optical path, to thereby vary an aperture size of said aperture.

2. An exposure control device as defined in claim 1, wherein said first filter plate comprises a transparent glass plate with a color temperature conversion filter layer and a green reflection band-pass filter layer superimposed on one major surface thereof.

3. An exposure control device as defined in claim 1, wherein said pair of cam grooves is formed in said filter holding frame.

4. An exposure control device as defined in claim 2, wherein said pair of aperture blades is located on a side of said first filter holding frame facing a source of light propagating along said optical path.

5. An exposure control device as defined in claim 2, wherein said color temperature conversion filter is a light balancing filter.

6. An exposure control device as defined in claim 3, wherein each of said aperture blades has formed therein a slot extending in a direction perpendicular to said optical path and to said first direction and further comprising pins fixed relative to movement of said first filter holding frame and engaging respective ones of said slots.

7. An exposure control device as defined in claim 1, further comprising:
    a second filter holding frame movable in a direction perpendicular to said optical axis and having a transparent section disposed between a filter section of a first color and a filter section of a second color; and
    a third filter holding frame movable in a direction perpendicular to said optical axis and having a transparent section disposed between a filter section of said first color and a filter section of a third color.

* * * * *